(12) United States Patent
Hong

(10) Patent No.: US 8,614,782 B2
(45) Date of Patent: Dec. 24, 2013

(54) LIQUID CRYSTAL LENS AND IMAGE DISPLAY DEVICE INCLUDING THE SAME

(75) Inventor: Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 817 days.

(21) Appl. No.: 11/607,847

(22) Filed: Dec. 4, 2006

(65) Prior Publication Data
US 2007/0296911 A1    Dec. 27, 2007

(30) Foreign Application Priority Data
Jun. 27, 2006   (KR) .................. 10-2006-0058233

(51) Int. Cl.
*G02F 1/13*     (2006.01)
*G02F 1/1335*   (2006.01)

(52) U.S. Cl.
USPC .......................................... 349/200; 349/15

(58) Field of Classification Search
USPC .................................. 349/200, 15
See application file for complete search history.

(56) References Cited

U.S. PATENT DOCUMENTS

| | | | | |
|---|---|---|---|---|
| 7,532,272 | B2 * | 5/2009 | Woodgate et al. | 349/95 |
| 7,787,063 | B2 * | 8/2010 | Hirose | 349/2 |
| 7,855,756 | B2 * | 12/2010 | Hong et al. | 349/15 |
| 8,351,004 | B2 * | 1/2013 | Chiu | 349/126 |
| 8,502,953 | B2 * | 8/2013 | Im | 349/200 |
| 2006/0273284 | A1 * | 12/2006 | Hirose | 252/299.61 |
| 2011/0102689 | A1 * | 5/2011 | Chiu | 349/15 |

FOREIGN PATENT DOCUMENTS

| | | |
|---|---|---|
| CN | 1423136 A | 6/2003 |
| CN | 1748179 A | 3/2006 |
| EP | 1 316 842 A1 | 6/2003 |
| GB | 2 398 130 A | 8/2004 |
| JP | 2007-017934 | 1/2007 |
| WO | WO 03/015424 A2 | 2/2003 |
| WO | WO 2006/101197 A1 | 9/2006 |

OTHER PUBLICATIONS

Hongwen Ren et al.; "Tunable-Focus Cylindrical Liquid Crystal Lens"; Japanese Journal of Applied Physics, vol. 43, No. 2, 2004, pp. 652-653; (2004).

* cited by examiner

Primary Examiner — Michelle R Connelly
Assistant Examiner — John M Bedtelyon
(74) Attorney, Agent, or Firm — McKenna Long & Aldridge, LLP

(57) ABSTRACT

A liquid crystal lens includes: a first substrate; a second substrate disposed facing the first substrate and separated from the first substrate by a predetermined distance; a first electrode on an inner surface of the first substrate; a second electrode on an inner surface of the second substrate, the second electrode including a first opening that has a first width; a third electrode on the second electrode, the third electrode including a second opening that has a second width; and a liquid crystal layer disposed between the first and third electrodes.

22 Claims, 8 Drawing Sheets

LIQUID CRYSTAL LENS AND IMAGE DISPLAY DEVICE INCLUDING THE SAME

This application claims the benefit of Korean Patent Application No. 10-2006-0058233, filed on Jun. 27, 2006, which is hereby incorporated by reference for all purposes as if fully set forth herein.

BACKGROUND OF THE INVENTION

1. Field of the Invention

The present invention relates to a liquid crystal lens, and more particularly to a liquid crystal lens in which a liquid crystal layer is driven using electrodes and an image display device including the same.

2. Discussion of the Related Art

Among the types of devices used to display images is the liquid crystal display (LCD) device. A typical LCD device includes first and second electrodes facing each other and a liquid crystal layer disposed between the first and second electrodes. Liquid crystal molecules of the liquid crystal layer are driven by an electric field generated by applying a voltage between the first and second electrodes. The liquid crystal layer has a polarization characteristic and optical anisotropy. The polarization characteristic may be defined as the tendency of the ends of liquid crystal molecules to become arranged in a single alignment direction, with the alignment direction of the liquid crystal molecule varying in accordance with the electric field when the liquid crystal molecule is disposed in the electric field. In addition, the optical anisotropy may be defined as the emitted light path or light polarization state variation according to the direction of incidence of light on the liquid crystal due to the thin and long shape of the liquid crystal molecule and the alignment direction of the liquid crystal molecules.

Accordingly, the liquid crystal layer shows a variation in the transmittance of incident light with a variation in the voltage applied between the first and second electrodes, allowing an image to be displayed by changing the transmittance of the liquid crystal of a pixel.

A liquid crystal lens has been suggested in which liquid crystal is used as a lens. A typical lens controls the path of light incident on the lens using a difference in properties between a material of the lens and air. When portions of a liquid crystal layer are driven by differing electric fields by applying different voltages across respective portions of the liquid crystal layer, the incident light entering the liquid crystal layer undergoes different phase changes in accordance with the location of the light incidence onto the liquid crystal. As a result, the liquid crystal layer can be used to control the path of incident light in a manner similar to that of a conventional glass lens.

Hereinafter, the structure and operation of liquid crystal lens of the related art will be explained with reference to FIGS. 1A, 1B, and 2.

FIG. 1A is a schematic perspective view of a liquid crystal lens according to the related art, and FIG. 1B is a schematic cross-sectional view of a liquid crystal lens according to the related art.

In FIGS. 1A and 1B, a liquid crystal lens 10 includes first and second substrates 20 and 30, and a liquid crystal layer 40 between the first and second substrates 20 and 30. A first electrode 22 is formed on an entire inner surface of the first substrate 20, and a second electrode 32 is formed on an inner surface of the second substrate 30. A first portion of the second electrode 32 is spaced apart from an adjacent second portion of the second electrode 32 by a predetermined separating distance "d."

When voltages are applied to the first and second electrodes 22 and 32, an electric field is generated between the first and second electrodes 22 and 32. Because the second electrode is separated into two portions rather than being formed of one continuous shape over an entire surface of the second substrate, the electric field generated between the first and second electrodes 22 and 32 is not uniformly vertical. In other words, while a first portion of the electric field between the first and electrodes 22 and 32 away from the separating portion 32a of the second electrode 32 is substantially vertical, a second portion of the electric field generated in the area adjacent to the separating portion 32a of the second electrode 32 has a direction sloping between the first and second substrates 20 and 30.

Accordingly, the intensity and the direction of the electric field generated by the first and second electrodes 22 and 32 each may vary in accordance with distance away from the separating portion 32a of the second electrode 32. As a result, the light passing through liquid crystal layer 40 driven by the electric field undergoes a change in phase that varies in accordance with the distance of the light from the separating portion 32a of the second electrode 32.

FIG. 2 illustrates the relationship between the phase change of incident light when light passes the liquid crystal lens of FIGS. 1A and 1B and the position of incidence of the light on the liquid crystal lens. FIG. 2 additionally graphically displays the phase change of light through a conventional glass lens for purposes of comparison.

In FIG. 2, first, second and third curves 40a, 40b and 40c show a phase change of light passing the liquid crystal lens, and a fourth curve 40d shows a phase change of light passing the an conventional optic lens made of glass or the like. As may be appreciated by considering the first, second and third curves 40a, 40b and 40c, the shape of the phase change curve for light passing the liquid crystal lens is symmetric shape with respect to the position of the separating portion 32a (of FIGS. 1A and 1B) of the second electrode 32 (of FIGS. 1A and 1B).

The series of first, second and third curves 40a, 40b and 40c correspond to phase change curves for gradually increasing values of the separating distance "d" (of FIGS. 1A and 1B). However, even when the separating distance "d" (of FIGS. 1A and 1B) is appropriately finely controlled, the range of control range of the phase change characteristic of the liquid crystal lens is substantially limited. For example, the range of control does not allow obtaining a phase changing characteristic substantially similar to the phase change curve for a conventional glass lens. For example, while the first and second curves 40a and 40b overall illustrate smaller phase change than the fourth curve 40d, the third curve 40c overall illustrates a larger variation in phase change than the fourth curve 40d for the conventional glass lens.

The shape of the phase change curve is dependent on only the voltage applied to the second electrode 32 and the separating distance "d". Consequently, even if the phase change of the liquid crystal lens is appropriately controlled by controlling the applied voltage, it is impossible to obtain the same phase change characteristic as obtained using the conventional glass lens.

SUMMARY OF THE INVENTION

Accordingly, the present invention is directed to a liquid crystal lens and an image display device including the same that substantially obviates one or more of the problems due to limitations and disadvantages of the related art.

An advantage of the present invention provides a liquid crystal lens that can more easily control a phase change by driving a liquid crystal layer using three electrodes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal lens includes: a first substrate; a second substrate disposed facing the first substrate and separated from the first substrate by a predetermined distance; a first electrode on an inner surface of the first substrate; a second electrode on an inner surface of the second substrate, the second electrode including a first opening that has a first width; a third electrode on the second electrode, the third electrode including a second opening that has a second width; and a liquid crystal layer disposed between the first and third electrodes.

In another aspect of the present invention, an image display device includes: a display panel; a liquid crystal lens on a front surface of the display panel, including: first and second substrates facing and spaced apart by a predetermined distance; a first electrode on an inner surface of the first substrate; a plurality of second electrodes disposed on an inner surface of the second substrate, each of the plurality of second electrodes including a first opening having a first width d1; a plurality of third electrodes disposed on the plurality of second electrodes, each of the plurality of third electrodes including a second opening having a second width d2; and a liquid crystal layer disposed between the first electrode and the plurality of third electrodes.

In another aspect of the present invention, an image display device includes: a display panel; a liquid crystal lens on a front surface of the display panel including: first and second substrates facing and spaced apart by a predetermined distance; a first electrode on an inner surface of the first substrate; a plurality of second electrodes disposed on an inner surface of the second substrate, the second electrodes spaced apart by a first distance; a plurality of third electrodes disposed on the plurality of second electrodes, the third electrodes spaced apart by a second distance, wherein each third electrode overlaps a respective second electrode; and a liquid crystal layer disposed between the first electrode and the plurality of third electrodes.

In another aspect of the present invention, a method for displaying multiple images includes: forming a display panel to having a first pixel for displaying a first image and a second pixel for displaying a second image; and forming a liquid crystal lens on a front surface of the display panel having; first and second substrates facing and spaced apart by a predetermined distance; a first electrode on an inner surface of the first substrate; a plurality of second electrodes disposed on an inner surface of the second substrate; a plurality of third electrodes disposed on the plurality of second electrodes; and each third electrode overlapping a respective second electrode; and a liquid crystal layer disposed between the first electrode and the plurality of third electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, similar reference numbers will be used throughout the drawings to refer to the same or like parts.

Hereinafter, embodiments according to the present invention will be explained.

Figure 1A:
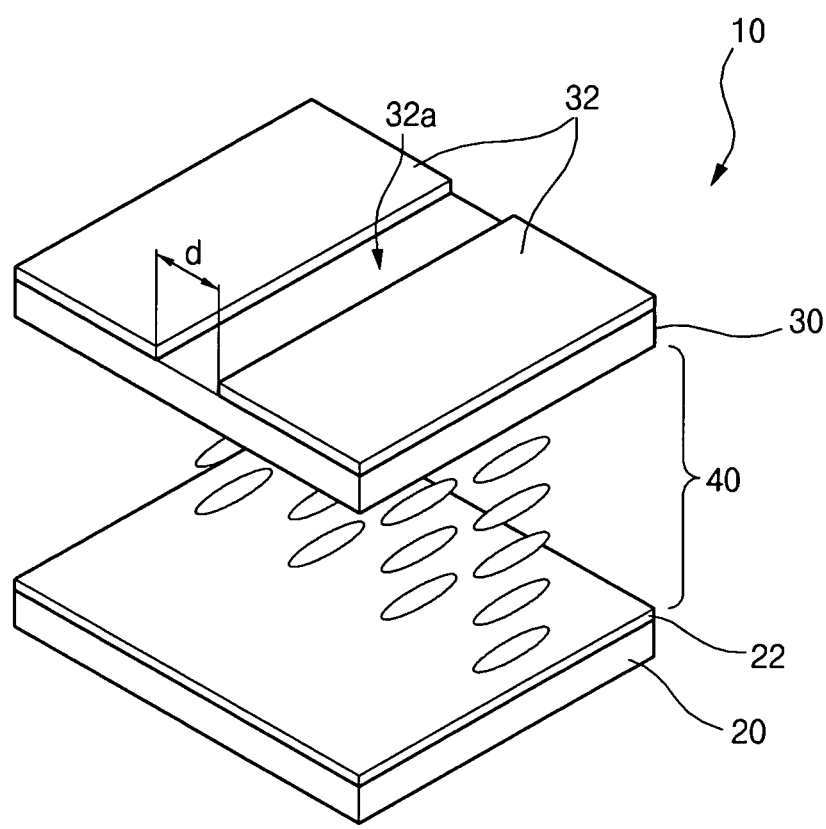
FIG. 1A is a schematic perspective view of a liquid crystal lens according to the related art.
Figure 1B:
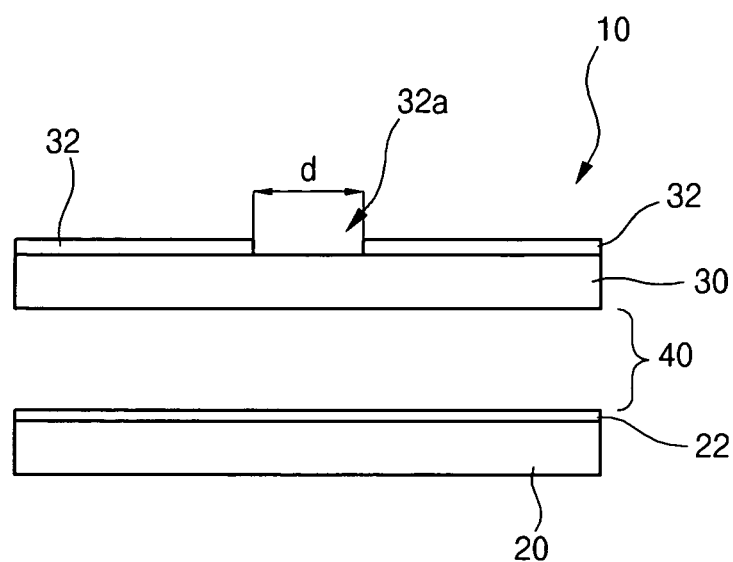
FIG. 1B is a schematic cross-sectional view of a liquid crystal lens according to the related art.
Figure 2:
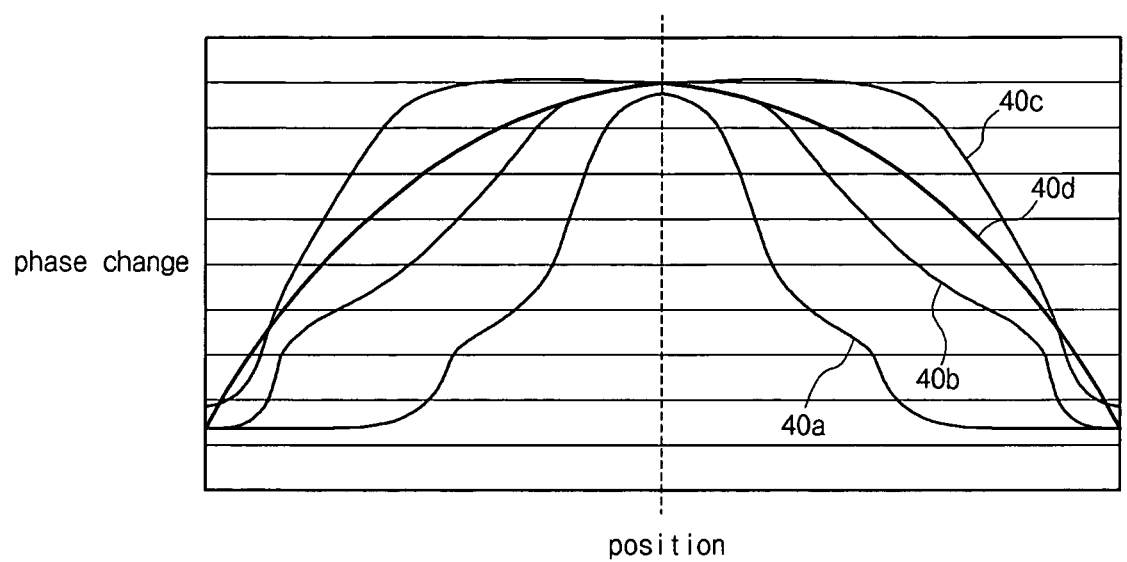
FIG. 2 a graph showing a phase change of incident light when light passes the liquid crystal lens of FIGS. 1A and 1B.
Figure 3:
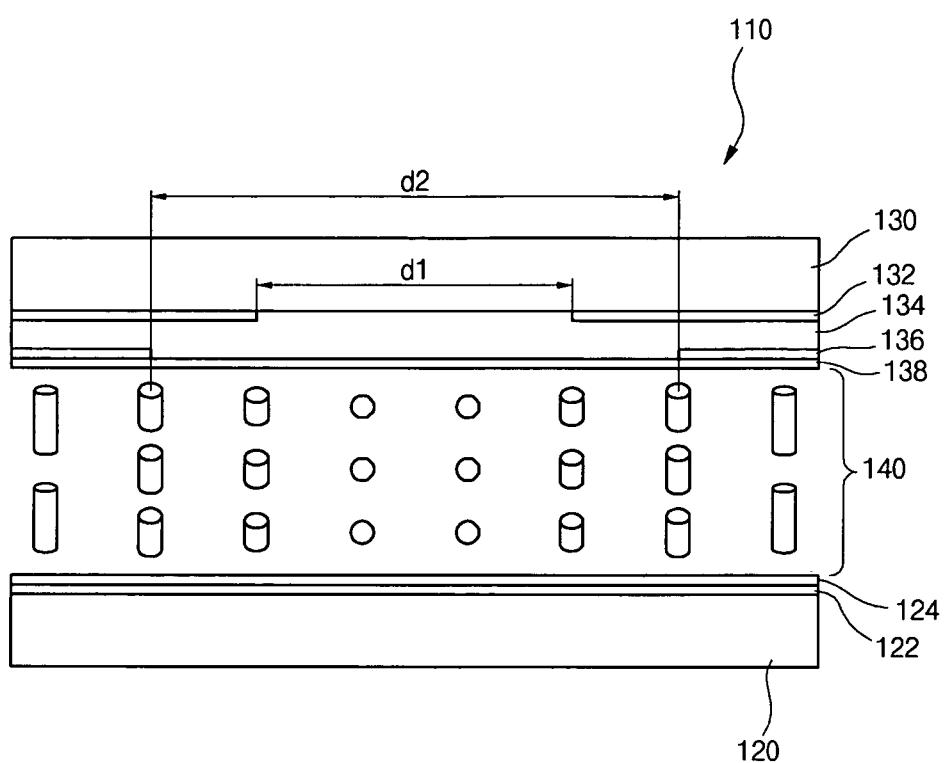
FIG. 3 is a schematic cross-sectional view showing a liquid crystal lens according to an embodiment of the present invention.

FIG. 3 is a schematic cross-sectional view showing a liquid crystal lens according to an embodiment of the present invention.

In FIG. 3, a liquid crystal lens 110 includes first and second substrates 120 and 130 facing and spaced apart from each other, and a liquid crystal layer 140 between the first and second substrates 120 and 130. A first electrode 122 is formed on an inner surface of the first substrate 120, and a first alignment layer 124 is formed on the first electrode 122.

A second electrode 132, which has a first opening having a width corresponding to a first distance "d1" is formed on an inner surface of the second substrate 130 with the first opening located at a central portion of the inner surface of the second substrate 130. An insulating layer 134 is formed on the second electrode 132. A third electrode 136, which has a second opening having a width corresponding to a second distance "d2" is formed on the insulating layer 134 with the second opening located at central portion of the second substrate 130. A second alignment layer 138 is formed on the third electrode 136. The second and third electrodes 132 and 136 are electrically insulated with each other and partially overlap each other. While each of the second and third electrodes 132 and 136 appear in the plan view to be formed of portions separated by the first and second openings respectively, the portions of each of the second and third electrodes 132 and 136 may be connected together at the end portions of the first and second openings, respectively. In other words, each of the second and third electrodes 132 and 136 may be formed as a single or integral body having an opening.

A liquid crystal layer 140 is disposed between the first and second alignment layers 124 and 138. The first and second alignment layers 124 and 138 may be omitted. In addition, a first passivation layer may be formed between the first electrode 122 and the first alignment layer 124, and a second passivation layer may be formed between the third electrode 136 and the second alignment layer 138. Additionally, the first, second and third electrodes 122, 132 and 136 may be formed of a transparent conductive material.

In the illustrated embodiment according to the present invention, an electric field is generated by first, second and third voltages applied to the first, second and third electrodes 122, 132 and 136, respectively. The intensity and the direction of the generated electric field may be controlled in accordance with value of the first, second and third voltages and the first and second distances "d1 and d2," potentially allowing finer control over the electric field than is achievable using the structure of the related art.

The finer control of the variation of intensity and direction of the electric field over position allows a phase curve substantially the same as that of a conventional glass lens to be obtained by appropriately controlling the first, second and third voltages and the first and second distances "d1" and "d2."

In other words, the liquid crystal lens according to the present invention generates an electric field that can be minutely controlled to control the refractive index of the liquid crystal layer 140, and the phase change of the incident light passing the liquid crystal layer 140, to allow the liquid crystal lens to effect the path of an incident light in substantially the same way and degree as does a conventional glass lens.

Hereinafter, a method for driving of the liquid crystal lens 110 will be described. The first, second and third voltages applied to the first, second and third electrodes may be different from each other and each voltage may be a direct current voltage or a alternating current voltage. If the electric field is generated by continuous application of a direct current voltage to the liquid crystal layer 140, the alignment of the liquid crystal layer may be deteriorated by an accumulation of charge due to current flow in a single direction.

Accordingly, an alternating current voltage may be used for at least one of the first, second and third voltages. For example, a direct current voltage may be applied to the first electrode 122, while alternating current voltages may be applied to the second and third electrodes 132 and 136. The alternating current voltages of the second and third electrodes 132 and 136 may have the same frequency as each other and may have different amplitudes or phases from each other.

In addition, although in FIG. 3, the first distance "d1" is illustrated to be smaller than the second distance "d2," in other embodiments of the invention, the first distance "d1" may be larger than the second distance "d2" or may be equal to the second distance "d2."

The liquid crystal lens can be utilized for various optical purposes. For example, the liquid crystal lens may be used with image display devices for displaying two-dimensional and three-dimensional images.

Figure 4:
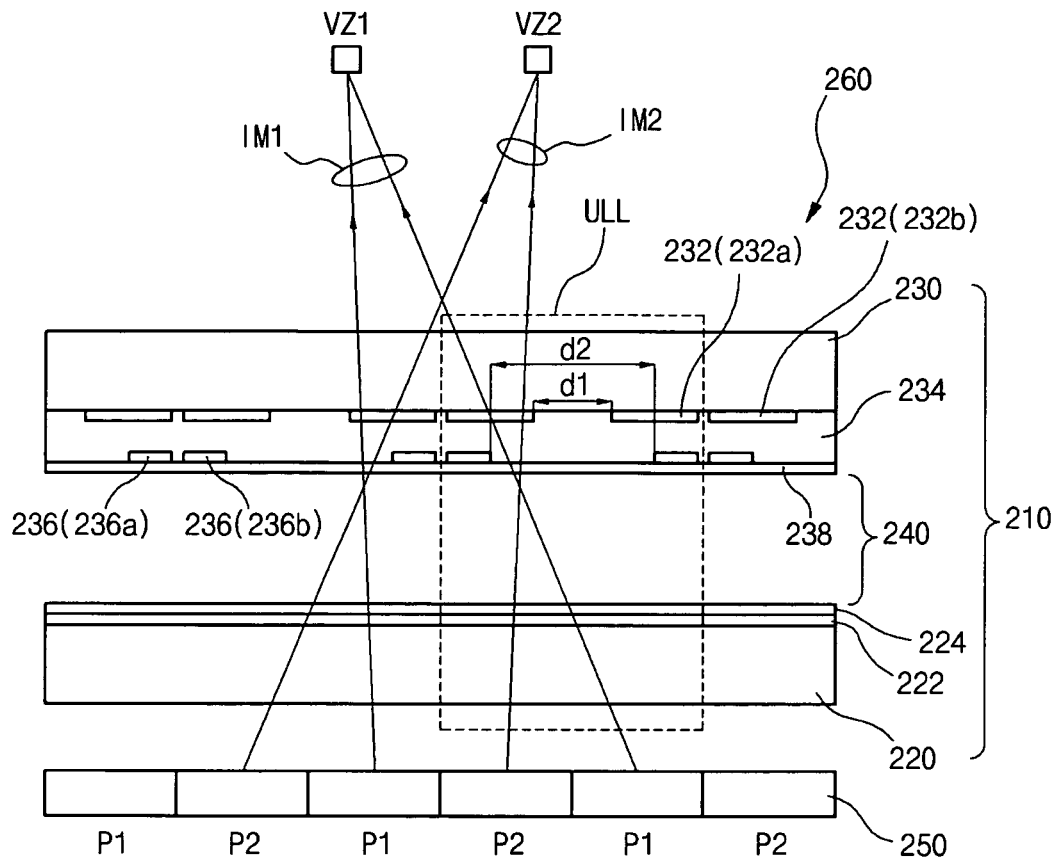
FIG. 4 is a schematic cross-sectional view of an image display device including a liquid crystal lens according to an embodiment of the present invention.

FIG. 4 is a schematic cross-sectional view of an image display device including a liquid crystal lens according to an embodiment of the present invention.

For clarity of explanation, portions of the detailed explanation that are the same as that for the embodiment illustrated in FIG. 3 are omitted.

The image display device 260 shown in FIG. 4 includes a display panel 250 and a liquid crystal lens 210. The liquid crystal lens 230 includes first and second substrates 220 and 230 facing and spaced apart from each other and a liquid crystal layer 240 between the first and second substrates 220 and 230. A first electrode 222 is formed on an inner surface of the first substrate 220, and a first alignment layer 224 is formed on the first electrode 222.

A plurality of second electrodes 232 are formed on an inner surface of the second substrate 230. Each of the plurality of second electrodes 232 has a first opening having a width corresponding to a first distance "d1." An insulating layer 234 is formed on the plurality of the second electrodes 232. A plurality of third electrodes 236 are formed on the insulating layer 234. Each of the plurality of third electrodes 236 has a second opening having a width corresponding to a second distance "d2." A second alignment layer 238 is formed on the plurality of third electrodes 236. The plurality of second electrodes 232 and the plurality of third electrodes 236 are electrically insulated with each other by the insulating layer 234 and electrodes of the plurality of second electrodes partially overlap respective ones of the plurality of third electrodes. Each of the plurality of second electrodes 232 and the plurality of third electrodes 236 may be formed as a bar shaped extension along a direction perpendicular to the view in FIG. 4. Alternatively, each of the second electrodes 232 and the third electrodes 236 may be respectively connected to an adjacent second electrode 232 and an adjacent third electrode 236 at end portions of the first and second openings, respectively.

In similar fashion to the liquid crystal lens illustrated in FIG. 3, the liquid crystal lens 210 may be induced to perform as a lens by applying voltages to the respective electrodes. The first electrode 222, pairs of the second electrodes 232 and pairs of the third electrodes 236 form unit liquid lenses "ULL." In other words, when the first, second and third voltages are applied to the first electrode 222, a pair of second electrodes 232, and a pair of third electrodes 236, respectively, each unit liquid crystal lens "ULL" acts as a cylindrical lens, and the liquid crystal lens 210 as a whole acts as a plurality of interconnected cylindrical lenses.

Although the second and third electrodes 232 and 236 is divided into unit liquid crystal lenses "ULL" in FIG. 4, the second and third electrodes 232 and 236 are formed as one body with adjacent second and third electrodes 232 and 236, respectively. By applying a common voltage is applied to the second electrode 232 and to the adjacent second electrode 232, and a common voltage to the third electrode 236 and the adjacent third electrode 236, respectively, the respective unit liquid crystal lenses "ULL" each have substantially the same optical properties.

The electric field is generated by the first, second and third voltages respectively applied to the first, second, and third electrodes 222, 232, and 236, and the liquid crystal layer 240 is driven by the generated electric field. The intensity and the direction of the generated electric fields are controlled by values of the first, second and third voltages and the first and second distances "d1 and d2," to thereby control the shape of the phase change curve for the liquid crystal layer 240.

The first, second and third voltages may be different from each other and a direct current voltage or an alternating current voltages may be used for any of the first, second and third voltages. For example, at least one of the first, second and third voltages may be the alternating current voltage, and a direct voltage may be applied to the first electrode 222. The second and third voltages applied respectively to the second and third electrodes 232 and 236 may be alternating current voltages having the same frequency and the second and third voltages may differ from each other in amplitude and/or phase.

Meanwhile, first and second image pixels "P1 and P2" are alternately arranged in a display panel 250. The first and second image pixels "P1 and P2" display first and second images "IM1 and IM2," respectively. The display panel 250 may be, for example, a flat panel display (FPD) such as a liquid crystal display (LCD) device, an organic light emitting display device (OLED), a plasma display panel (PDP), or a field emission display (FED) device, or other display devices in which pixels for displaying images are formed from fixed physical structures of the display device.

When the first, second and third voltages are applied to the first, second and third electrodes 222, 232 and 236, the liquid crystal lens 210 acts as an optical lens. The first and second images emitted from the display panel 250 is transferred to the first and second viewing zone "VZ1 and VZ2" by the liquid crystal lens 210. If the distance between the first and second viewing zone "VZ1 and VZ2" corresponds to the distance between a user's two eyes, users will perceive a three-dimensional image by a stereographic synthesis of the first and second images "IM1 and IM2" at the first and second viewing zone "VZ1 and VZ2."

On the other hand, when the first, second and third voltages are not applied to the first, second and third electrodes 222, 232 and 236, the liquid crystal lens 210 performs optically as a non-refracting transparent medium transmitting the first and second images "IM1 and IM2." Accordingly, the first and second images "IM1 and IM2" are transmitted to the users without division of the visual field, and then users perceive a two-dimensional image rather than a three-dimensional image.

Consequently, the image display device including the liquid crystal lens according to the embodiments of the present invention can display one of a two-dimensional image and a three dimensional image in accordance with an ON/OFF state of the voltages applied to the respective electrodes of the liquid crystal lens.

The liquid crystal lens according to the present invention can generate an electric field using three electrodes and drives a liquid crystal layer using the electric field to thereby minutely controlling the phase change of incident light in the liquid crystal layer to obtaining a phase change characteristic substantially the same as that of a conventional glass lens.

Further, the image display device including the liquid crystal lens can display and change the two-dimensional image and the three-dimensional image by controlling the voltage applied to the liquid crystal lens.

Figure 5:
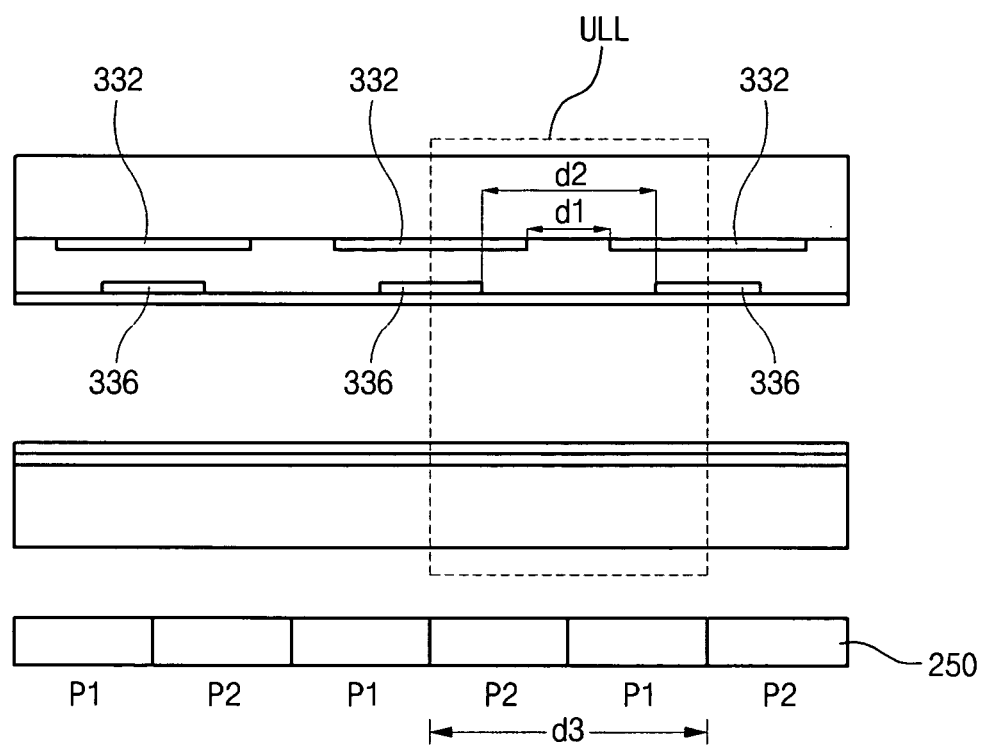
FIG. 5 is a schematic cross-sectional view of an image display device including a liquid crystal lens according to an embodiment of the present invention.

FIG. 5 is a schematic cross-sectional view of an image display device including a liquid crystal lens according to an embodiment of the present invention.

For clarity of explanation, portions of the detailed explanation that are the same as that for the embodiment illustrated in FIG. 4 are omitted.

As described above, in the embodiment in FIG. 4, the plurality of second electrodes 232 and the plurality of third electrodes 236 are divided into a plurality of unit liquid crystal lens "ULL."

However, for the embodiment illustrated in FIG. 5, two second electrodes 232a and 232b (of FIG. 4) and two third electrodes 236a and 236b (of FIG. 4) at boundary of unit liquid crystal lenses "ULL" are formed as one body, respectively in order to remove a space between the phase changes in respective unit liquid crystal lenses "ULL." As shown in FIG. 5, the second electrode has an opening having a width "d1", the third electrode has an opening having a width "d2", and a unit liquid crystal cell "ULL" has a width "d3". The width "d3" may be substantially the same as the combined with of pixels P1 and P2 of a display, the pixel P1 for displaying a first image and the pixel P2 for displaying a second image.

Adjacent unit liquid crystal lenses "ULL" share a second thermal electrode and a third electrode 332 and 336.

Figure 6:
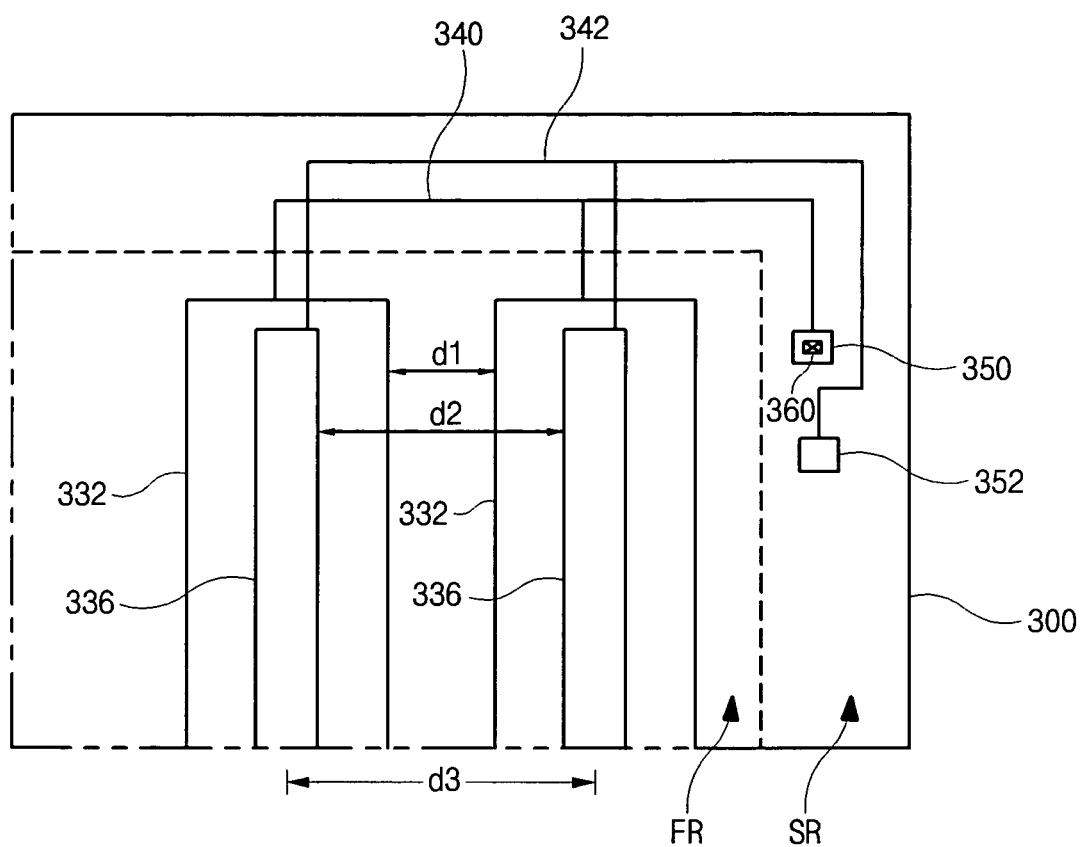
FIG. 6 is a schematic plan view of a liquid crystal lens regarding FIG. 5 according to an embodiment of the present invention.

FIG. 6 is a schematic plan view of a liquid crystal lens regarding FIG. 5 according to an embodiment of the present invention.

As shown in FIG. 6, a first region and a second region "FR" and "SR" in a periphery of the first region "FR" are defined in a substrate 300. The second electrode 332 and the third electrode 336 are formed on the substrate 300 in the first region "FR." Further, first and second connection lines 340 and 342 extending from the second and third electrodes 332 and 336 are formed in the second region "SR." The first connection line 340 connects adjacent second electrodes 332 adjacent to each other. Furthermore, the second connection line 342 connects the adjacent third electrodes 336 to each other.

A first pad 350 and a second pad 352 are extended from end portions of the first and second connection lines 340 and 342, respectively. A contact hole 360 partially exposes a first pad 350 disposed under an insulating layer between the first pad 350 and the second pad 352. Voltages from an external circuit are applied to the second and third electrodes 332 and 336 through the first and second pads 350 and 352: The external circuit supplying the second electrode voltage may be connected to the first pad 350 via the contact hole 360.

Forming the liquid crystal lens 210 includes forming the second electrode 332, the first connection line 340, and the first pad 350 on the substrate 300, forming the insulating layer on the second electrode 332, the first connection line 340, and the first pad 350, forming the third electrode 336, the second connection line 342, and the second pad 352 on the insulating layer, and etching the insulating layer to form the contact hole 360 that exposes a portion of the first pad 350.

Figure 7:
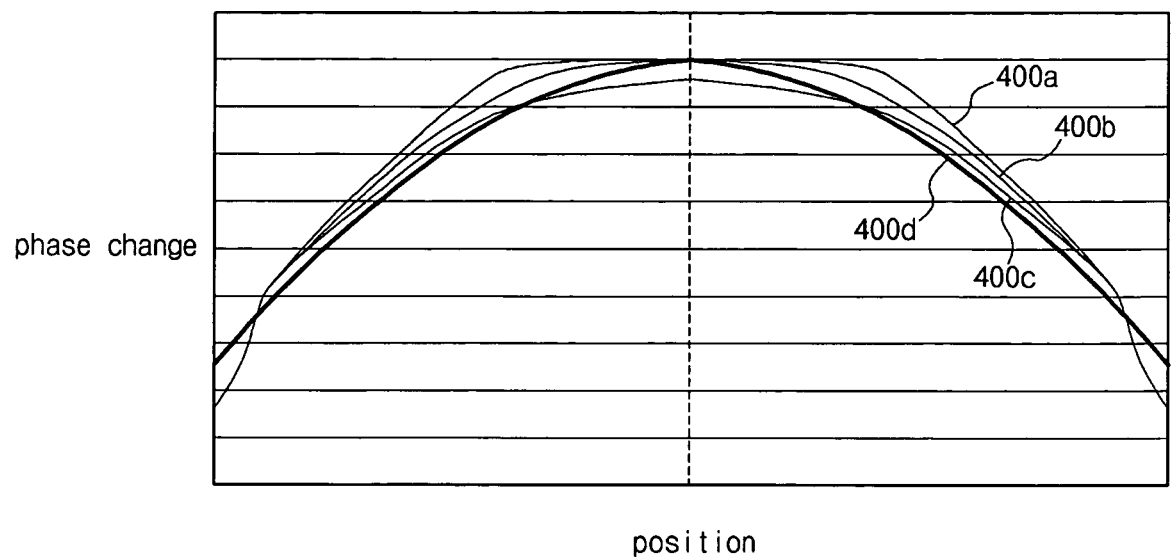
FIG. 7 is a graph illustrating the relationship between the phase change of incident light passing through a liquid crystal lens according to embodiments of the present invention and the position of incidence of the light on the liquid crystal lens.

FIG. 7 illustrates the relationship between the phase change of incident light passing through a liquid crystal lens according to embodiments of the present invention and the position of incidence of the light on the liquid crystal lens.

By setting parameters associated with the liquid crystal lens according to the present invention, particular characteristic curves relating the phase change of incident light passing through the liquid crystal lens to the position of incidence of the light on the liquid crystal lens may be obtained. For example, by setting the first distance "d1" equal to the width of the opening in the second electrodes, the second distance "d2" equal to the width of the opening of the third electrodes, and a third distance "d3" equal to the combined width of the image pixels P1 and P2 in accordance with a predetermined relationship, various characteristic curves such as curves 400a, 400b, and 400c in FIG. 7 can be obtained.

For example, the first to third electrodes 122, 132 and 136 can be made of indium tin oxide (ITO). When a width of the unit liquid crystal lens "ULL" is about 200 micrometers, a dimension 'd3' equal to the combined width of image pixels P1 and P2 of the display can similarly be about 200 micrometers.

In the example liquid crystal lens producing the characteristic curves shown in FIG. 7, a width of the third electrode 136 and the second distance "d2" are about 5 micrometers and about 190 micrometers, respectively.

In addition, voltages applied to the second and third electrodes 132 and 136 are determined as 4V can be about 1V, respectively.

For example, when a width of the second electrode 132 is about 40 micrometers and the first distance "d1" is about 120 micrometers, a first curve 400a is obtained.

When a width of the second electrode 132 is about 60 micrometers and the first distance "d1" is about 80 micrometers, a second curve 400b is obtained.

Lastly, when a width of the second electrode 132 is about 80 micrometers and the first distance "d1" is about 40 micrometers, a third curve 400c is obtained.

More generally, when, a ratio of the first distance "d1" divided by the distance d3 equal to the sum of the widths of the image pixels P1 and P2 of the display (i.e. the ratio d1/d3 or d1/[P1+P2]) or is about 0.2 to about 0.6, and a difference between the third distance "d3" and the second distance "d2" (i.e. d3−d2 or [P1+P2]−d2) is from about 5 micrometers to about 15 micrometers characteristic curves for the liquid crystal lens substantially similar to the characteristic curve for a conventional glass lens 400d may be obtained. For example, the difference d3-d2 may be about 10 micrometers.

Accordingly, the first to third curves 400a, 400b and 400c, each having substantially have the same profile as a fourth curve 400d for a conventional glass lens may be generated when d1, d2, and d3 are selected as described above. Other characteristic curves may be generated using parameters selected using other relationships.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal lens, comprising:
a first substrate;
a second substrate disposed facing the first substrate and separated from the first substrate by a predetermined distance;
a first electrode on an inner surface of the first substrate;
a first alignment layer directly on the first electrode;
a single second electrode on an inner surface of the second substrate, the single second electrode including a first opening that has a first width;
an insulating layer directly on the single second electrode;
a single third electrode formed as a single layer directly on the insulating layer, the single third electrode including a second opening that has a second width;
a second alignment layer directly on the third electrode; and
a liquid crystal layer disposed between the first and second alignment layers, wherein the single second electrode and the single third electrode have a same bar shape and entirely overlap with each other, and wherein a single liquid crystal lens is formed by the first electrode, the single second electrode including the first opening and the single third electrode including the second opening, and does not include any other electrode.

2. The liquid crystal lens according to claim 1, further comprising a first passivation layer disposed between the first electrode and the first alignment layer.

3. The liquid crystal lens according to claim 1, further comprising a second passivation layer disposed between the third electrode and the second alignment layer.

4. The liquid crystal lens according to claim 1, wherein the first width is smaller than the second width.

5. The liquid crystal lens according to claim 1, wherein the first electrode is disposed on an entire surface of the first substrate.

6. The liquid crystal lens according to claim 1, wherein the first and second openings are disposed at a central position of the first and second electrodes, respectively.

7. An image display device, comprising:
a display panel;
a liquid crystal lens on a front surface of the display panel, including:
first and second substrates facing and spaced apart by a predetermined distance;
a first electrode on an inner surface of the first substrate;
a first alignment layer directly on the first electrode;
a single second electrode disposed on an inner surface of the second substrate, the single second electrode including a first opening having a first width d1;
an insulating layer directly on the single second electrode;
a single third electrode formed as a single layer directly on the insulating layer, the single third electrode including a second opening having a second width d2;
a second alignment layer directly on the third single electrode; and
a liquid crystal layer disposed between the first and second alignment layers, wherein the single second electrode and the single third electrode have a same bar shape and match one to one, and wherein the single second electrode and the single third electrode entirely overlap with each other, and wherein a single liquid crystal lens is formed by the first electrode, the single second electrode including the first opening and the single third electrode including the second opening, and does not include any other electrode.

8. The image display device of claim 7, wherein the display panel includes a first pixel having a width P1 to display a first image and a second pixel to display a second image having a width P2, and wherein a ratio d1/(P1+P2) has a first predetermined value, and wherein the difference (P1+P2)−d2 has a second predetermined value.

9. The image display device of claim 8, wherein the first predetermined value has a range of about 0.2 to about 0.6.

10. The image display device of claim 8, wherein the second predetermined value has a range of about 5 μm to about 15 μm.

11. The image display device of claim 8, wherein the second predetermined value is about 10 μm.

12. The image display device according to claim 7, wherein the single second electrode is formed in a single body.

13. The image display device according to claim 7, wherein a three-dimensional image is displayed when voltages are applied to the first electrode, the plurality of second electrodes and the plurality of third electrodes, and a two-dimensional image is displayed when voltages are not applied to the first electrode, the plurality of second electrodes and the plurality of third electrodes.

14. The image display device according to claim 7, wherein the display panel is selected from one of a liquid crystal display device (LCD), an organic light emitting display device (OLED), a plasma display panel (PDP) and a field emission display device (FED).

15. An image display device, comprising:
a display panel;
a liquid crystal lens on a front surface of the display panel, including:
first and second substrates facing and spaced apart by a predetermined distance;
a first electrode on an inner surface of the first substrate;

a first alignment layer directly on the first electrode;
a single second electrode disposed on an inner surface of the second substrate, the second single electrode including a first opening that has a first width;
an insulating layer directly on the single second electrode;
a single third electrode formed as a single layer directly on the insulating layer, the single third electrode including a second opening that has a second width, wherein the single third electrode entirely overlaps the single second electrode;
a second alignment layer directly on the third electrode; and
a liquid crystal layer disposed between the first and second alignment layers, wherein the single second electrode and the single third electrode have a same bar shape and entirely overlap with each other, and wherein a single liquid crystal lens is formed by the first electrode, the single second electrode including the first opening and the single third electrode including the second opening, and does not include any other electrode.

16. A method for displaying multiple images comprising:
forming a display panel having a first pixel for displaying a first image and a second pixel for displaying a second image; and
forming a liquid crystal lens on a front surface of the display panel having:
first and second substrates facing and spaced apart by a predetermined distance;
a first electrode on an inner surface of the first substrate;
a first alignment layer directly on the first electrode;
a single second electrode disposed on an inner surface of the second substrate, the single second electrode including a first opening that has a first width d1;
an insulating layer directly on the single second electrode;
a single third electrode formed as a single layer directly on the insulating layer, the single third electrode including a second opening that has a second width d2; and
the single third electrode entirely overlapping the single second electrode, wherein the single second electrode and the single third electrode have a same bar shape and entirely overlap with each other;
a second alignment layer directly on the single third electrode; and
a liquid crystal layer disposed between the first and second alignment layers, and wherein a single liquid crystal lens is formed by the first electrode, the single second electrode including the first opening and the single third electrode including the second opening, and does not include any other electrode.

17. The method according to claim 16, wherein first to third voltages are applied to the first to third electrodes, respectively, at least one of the first to third voltages is an alternating current (AC) voltage.

18. The method according to claim 17, wherein the first voltage is a direct current (DC) voltage, and the second and third voltages are the alternating current (AC) voltages having the same frequency as each other and having differing amplitudes.

19. The method according to claim 16, wherein the first pixel of the display panel has a width P1 and the second pixel of the display panel has a width P2, and wherein a ratio d1/(P1+P2) has a first predetermined value, and wherein the difference (P1+P2)−d2 has a second predetermined value.

20. The method according to claim 19, wherein the first predetermined value has a range of about 0.2 to about 0.6.

21. The method according to claim 19, wherein the second predetermined value has a range of about 5 μm to about 15 μm.

22. The method according to claim 19, wherein the second predetermined value is about 10 μm.

* * * * *